(12) United States Patent
Tamane et al.

(10) Patent No.: US 11,135,898 B2
(45) Date of Patent: Oct. 5, 2021

(54) REMOTE AIR CONDITIONING START SYSTEM AND CENTER SERVER

(71) Applicant: TOYOTA JIDOSHA KABUSHIKI KAISHA, Toyota (JP)

(72) Inventors: Yasuyuki Tamane, Miyoshi (JP); Masato Endo, Nagakute (JP); Kenichi Murata, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 405 days.

(21) Appl. No.: 15/878,906

(22) Filed: Jan. 24, 2018

(65) Prior Publication Data
US 2018/0222281 A1 Aug. 9, 2018

(30) Foreign Application Priority Data

Feb. 3, 2017 (JP) .............................. JP2017-019130

(51) Int. Cl.
*G05D 1/00* (2006.01)
*G05D 3/00* (2006.01)
(Continued)

(52) U.S. Cl.
CPC ......... *B60H 1/00657* (2013.01); *G07C 5/008* (2013.01)

(58) Field of Classification Search
CPC ............ B60H 1/00657; B60H 1/00271; B60H 1/00771; B60H 1/00807; B60H 1/00642;
(Continued)

(56) References Cited

U.S. PATENT DOCUMENTS

2010/0222939 A1* 9/2010 Namburu ............... B60R 16/037
701/2
2014/0100716 A1* 4/2014 Kawai ..................... B60L 1/003
701/2
(Continued)

FOREIGN PATENT DOCUMENTS

CN 105416173 3/2016
JP 11-62793 3/1999
(Continued)

OTHER PUBLICATIONS

Translate WO2015129164A1 (Year: 2015).*
Translate JP2004026038A (Year: 2004).*

*Primary Examiner* — Abby Y Lin
*Assistant Examiner* — Sohana Tanju Khayer
(74) *Attorney, Agent, or Firm* — Oblon, McClelland, Maier & Neustadt, L.L.P.

(57) ABSTRACT

A remote air conditioning start system includes a terminal of a user, a center server, and a vehicle that includes an air conditioner and is configured to communicate with the center server. The remote air conditioning start system includes first and second transmission units, first and second reception units, a start controller provided in the vehicle and configured to, when the second reception unit receives a start request, start the air conditioner, a determination unit provided in one of the terminal, the center server, and the vehicle and configured to determine necessity of defrosting of a window of the vehicle, and a notification unit provided in the terminal and configured to, when the determination unit determines that defrosting of the window is needed, notify the user that defrosting of the window is needed.

7 Claims, 8 Drawing Sheets

(51) Int. Cl.
*G06F 7/00* (2006.01)
*G06F 17/00* (2019.01)
*B60H 1/00* (2006.01)
*G07C 5/00* (2006.01)

(58) Field of Classification Search
CPC ......... G07C 5/008; B60S 1/023; Y02T 10/70; Y02T 10/7072; Y02T 90/14; Y02T 90/16; Y02T 10/72; B60L 2250/16; B60L 2260/56; B60L 2240/80; B60L 2240/34; B60L 2240/662; G08C 2201/93
See application file for complete search history.

(56) References Cited

U.S. PATENT DOCUMENTS

2016/0200166 A1* 7/2016 Stanek .................... H04W 4/44
165/202
2016/0375828 A1* 12/2016 Yun .......................... B60S 1/54
701/48

FOREIGN PATENT DOCUMENTS

| | | | |
|---|---|---|---|
| JP | 2004026038 A * | 1/2004 | |
| JP | 2013-39841 A | 2/2013 | |
| JP | 2013-238184 | 11/2013 | |
| WO | WO 2013/124990 A1 | 8/2013 | |
| WO | WO-2015129164 A1 * | 9/2015 | ......... B60H 1/00642 |

* cited by examiner

REMOTE AIR CONDITIONING START SYSTEM AND CENTER SERVER

INCORPORATION BY REFERENCE

The disclosure of Japanese Patent Application No. 2017-019130 filed on Feb. 3, 2017 including the specification, drawings and abstract is incorporated herein by reference in its entirety.

BACKGROUND

1. Technical Field

The present disclosure relates to a remote air conditioning start system and a center server.

2. Description of Related Art

In a system in which a user performs a remote start of an engine and an air conditioner from a distant place from a vehicle using a remote control, a technique in which an in-vehicle device performs drive control of a defroster based on information, such as an ambient temperature, is known (for example, see Japanese Unexamined Patent Application Publication No. 11-62793 (JP 11-62793 A) or the like).

SUMMARY

However, in JP 11-62793 A, since the defroster is automatically operated based on the ambient temperature or the like, it is not possible to reflect a user's intention, and there is a possibility that the defroster is operated against a user's intention. For example, in a case where the user gets on a vehicle and does work or the like before a driving start, while the inside of a cabin of the vehicle should be brought to a warm state, it is not possible to respond to demand that operation of the defroster is unneeded, and there is a possibility that unnecessary fuel consumption or power consumption occurs.

The disclosure provides a remote air conditioning start system and a center server capable of reflecting a user's intention in a case of performing defrosting of a window of a vehicle.

A first aspect of the disclosure relates to a remote air conditioning start system including a terminal of a user, a center server that is configured to communicate with the terminal, and a vehicle that includes an air conditioner and is configured to communicate with the center server. The remote air conditioning start system includes a first transmission unit, a first reception unit, a second transmission unit, a second reception unit, a start controller, a determination unit, and a notification unit. The first transmission unit is provided in the terminal and configured to transmit a start request of the air conditioner to the center server. The first reception unit is provided in the center server and configured to receive the start request from the terminal. The second transmission unit is provided in the center server and configured to transmit the start request received by the first reception unit to the vehicle. The second reception unit is provided in the vehicle and configured to receive the start request from the center server. The start controller is provided in the vehicle and configured to, when the second reception unit receives the start request, start the air conditioner. The determination unit is provided in one of the terminal, the center server, and the vehicle and configured to determine necessity of defrosting of a window of the vehicle. The notification unit is provided in the terminal and configured to, when the determination unit determines that defrosting of the window is needed, notify the user that defrosting of the window is needed.

According to the first aspect of the disclosure, the terminal (first transmission unit) transmits the start request of the air conditioner to the center server, the center server (first reception unit and second reception unit) transfers the received start request to the vehicle, and in a case were the start request is received, the vehicle (second reception unit and start controller) starts the air conditioner. Then, the determination unit that is provided in one of the terminal, the center server, and the vehicle determines necessity of defrosting of the window of the vehicle, and in a case where determination is made that defrosting of the window is needed, the terminal (notification unit) notifies the user that defrosting of the window is needed. Accordingly, for example, the user who plans to start driving immediately after getting on the vehicle can perform a remote operation to operate a defroster from the terminal or can perform a remote operation to extend an operation time of the air conditioner according to the notification that defrosting is needed. For example, the user who plans not to start driving immediately in order to do work or the like before the driving start after getting on the vehicle can avoid a particular additional operation even though the notification that defrosting is needed is provided. That is, it is possible to reflect a user's intention in a case of performing defrosting of the window of the vehicle.

In the remote air conditioning start system according to the first aspect of the disclosure, the notification unit may be configured to display on a display of the terminal that defrosting of the window is needed, and display a selection operation screen for allowing the user to select a predetermined mode intended for defrosting of the air conditioner on the display of the terminal.

According to the first aspect of the disclosure, on the display of the terminal, the display of the selection operation screen for selecting the predetermined mode intended for defrosting is performed along with the display to the effect that defrosting of the window of the vehicle is needed. Accordingly, the user who desires to defrost can select a mode intended for defrosting immediately without performing an additional operation. For this reason, it is possible to further improve convenience of the user.

The remote air conditioning start system according to the first aspect of the disclosure may further include a stop controller provided in one of the terminal, the center server, and the vehicle and configured to, when a set time has elapsed after the start controller starts the air conditioner, stop the air conditioner. The first transmission unit may be configured to transmit the start request including the set time for operating the air conditioner to the center server. The notification unit may be configured to display on the display of the terminal that defrosting of the window is needed and display a change operation screen for allowing the user to change the set time.

According to the first aspect of the disclosure, the terminal (first transmission unit) transmits the start request including the set time for operating the air conditioner to the vehicle through the center server, and the stop controller that is provided in one of the terminal, the center server, and the vehicle stops the air conditioner in a case where the set time has elapsed from a predetermined starting point (for example, the start itself may be set as a starting point or a time when another condition is satisfied after the start may be set as a starting point) after the start of the air conditioner based on the start request. Then, the terminal (notification unit) performs, on the display, the display of the change operation screen for changing the set time for operating the air conditioner along with the display to the effect that defrosting of the window of the vehicle is needed. Accordingly, the user who desires to defrost can perform a change operation, such as an operation to extend the set time for operating the air conditioner, immediately without performing an additional operation. For this reason, it is possible to further improve convenience of the user.

In the remote air conditioning start system according to the first aspect of the disclosure, the predetermined mode may include a defrosting mode in which defrosting by the air conditioner is performed, a set time change mode in which a set time of the air conditioner is changed, and a mode in which no countermeasure is taken to notification that the defrosting is needed.

The remote air conditioning start system according to the first aspect of the disclosure may further include a room temperature sensor provided in the vehicle, and a humidity sensor provided in the vehicle. The determination unit may be configured to determine whether the defrosting is needed by determining a possibility that frost is generated based on an inside temperature and inside humidity of the vehicle detected by the room temperature sensor and the humidity sensor.

The remote air conditioning start system according to the first aspect of the disclosure may further include an in-cabin camera provided in the vehicle. The determination unit may be configured to determine a possibility that frost is generated by analyzing a situation of a window included in a captured image of the in-cabin camera through image processing, and determine whether the defrosting is needed.

The remote air conditioning start system according to the first aspect of the disclosure may further include a GPS module configured to receive positional information of the vehicle. The determination unit may be configured to determine a possibility that frost is generated based on information relating to a current frost generation situation in each region or history information of past frost generation distributed from the center server and the positional information of the vehicle received by the GPS module, and determine whether the defrosting is needed.

A second aspect of the disclosure relates to a center server that is connected to be configured to communicate with a terminal of a user and a vehicle including an air conditioner. The center server is configured to receive a start request transmitted from the terminal, and to transmit the start request to the vehicle to start the air conditioner. The center server includes a determination unit and a transmission unit. The determination unit is configured to determine necessity of defrosting of a window of the vehicle. The transmission unit is configured to, when the determination unit determines that defrosting of the window is needed, transmit notification that defrosting of the window is needed, to the terminal.

In the center server according to the second aspect of the disclosure, the determination unit may be configured to determine whether the defrosting is needed based on sensor information transmitted from the vehicle.

According to the first and second aspects of the disclosure, it is possible to provide a remote air conditioning start system and a center server capable of reflecting a user's intention in a case of performing defrosting of a window of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a mode for carrying out the disclosure will be described referring to the drawings.

First Embodiment

First, the configuration of a remote air conditioning start system 1 according to the embodiment will be described referring to FIGS. 1 to 4.

Figure 1:
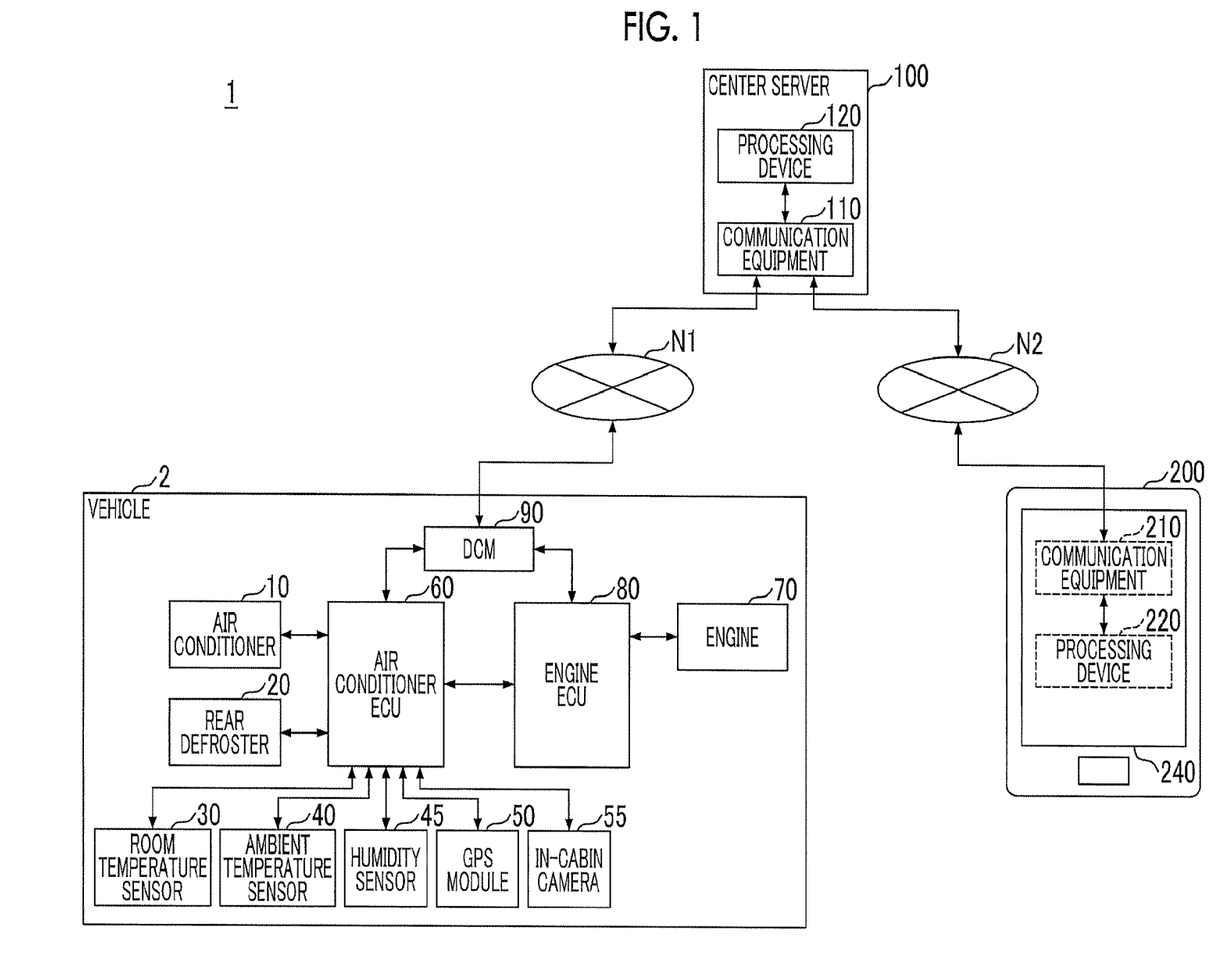
FIG. 1 is a configuration diagram showing an example of the configuration of a remote air conditioning start system.
Figure 2:
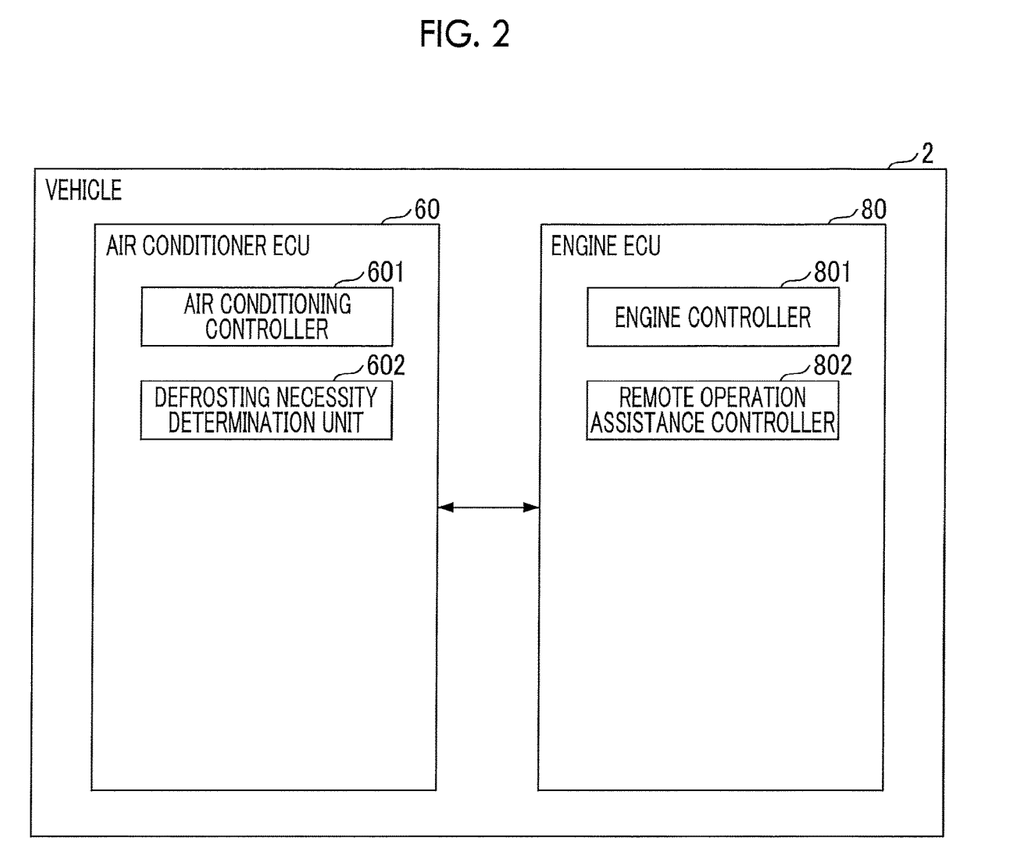
FIG. 2 is a functional block diagram showing an example of the functional configuration of a vehicle (air conditioner ECU and engine ECU) according to a first embodiment.
Figure 3:
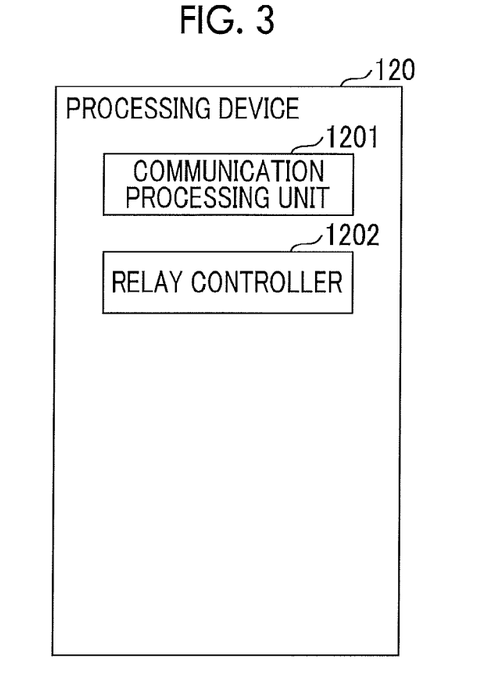
FIG. 3 is a functional block diagram showing an example of the functional configuration of a center server (processing device) according to the first embodiment.
Figure 4:
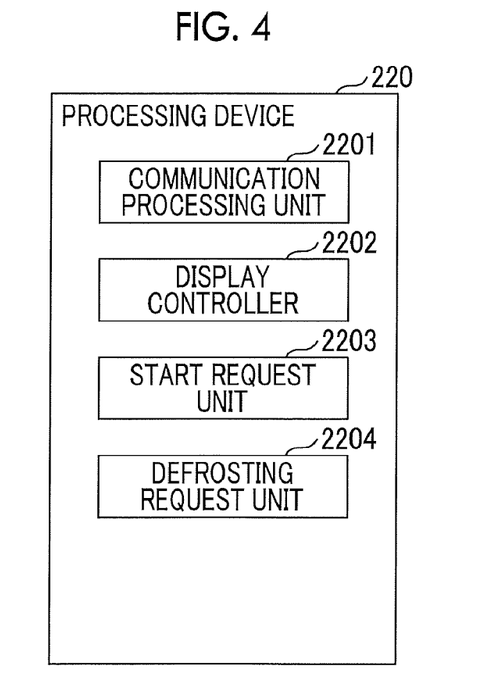
FIG. 4 is a functional block diagram showing an example of the functional configuration of a terminal (processing device) according to the first embodiment.

FIG. 1 is a configuration diagram showing an example of the configuration of the remote air conditioning start system 1 according to the embodiment. FIG. 2 is a functional block diagram showing an example of the functional configuration of a vehicle 2 (air conditioner ECU 60 and engine ECU 80). FIG. 3 is a functional block diagram showing an example of the functional configuration of a center server 100 (processing device 120). FIG. 4 is a functional block diagram showing an example of the functional configuration of a terminal 200 (processing device 220).

The remote air conditioning start system 1 includes the vehicle 2, the center server 100, and the terminal 200 that is carried with a user, and starts an air conditioner 10 described below of the vehicle 2 according to a start request to be transmitted from the terminal 200 to the vehicle 2 through the center server 100.

The vehicle 2 includes the air conditioner 10, a rear defroster 20, a room temperature sensor 30, an ambient temperature sensor 40, a humidity sensor 45, a global positioning system (GPS) module 50, an in-cabin camera 55, an air conditioner electronic control unit (ECU) 60, an engine 70, an engine ECU 80, and a DCM 90.

The air conditioner 10 adjusts an inside temperature or the like of the vehicle 2. The air conditioner 10 includes, for example, a refrigeration cycle including an evaporator (not shown), a compressor (not shown) that is driven by the engine 70, and the like, and a heater (not shown) having a coolant of the engine 70 as a heat source. The air conditioner 10 adjusts the temperature of air sent out from a blowout port by appropriately mixing air (cold air) cooled while passing through the evaporator and air (hot air) warmed with the coolant of the engine 70 as a heat source under the control of the air conditioner ECU 60 (air conditioning controller 601 described below) such that the ratio is changeable. The air conditioner 10 has a defroster mode (defrosting mode), and removes frost generated outside or frost generated inside of a cabin of a windshield of the vehicle 2 by sending out air having relatively low humidity and relatively high temperature along the front windshield of the vehicle 2 from a blowout port corresponding to the defroster mode.

The rear defroster 20 removes frost generated outside or frost generated inside the cabin of a rear windshield of the vehicle 2 under the control of the air conditioner ECU 60. The rear defroster 20 includes, for example, an electrically heated wire embedded in the rear windshield.

The room temperature sensor 30 is provided inside the cabin of the vehicle 2, for example, inside an instrument panel (not shown), and detects the temperature (inside temperature) inside the cabin. The room temperature sensor 30 is connected to be configured to communicate with the air conditioner ECU 60 through a one-to-one communication line or an in-vehicle network, such as a controller area network (CAN), and a detection signal corresponding to the detected inside temperature is transmitted to the air conditioner ECU 60.

The ambient temperature sensor 40 is provided outside the cabin of the vehicle 2, for example, in a front end portion (a portion where outside air is introduced) of an engine compartment provided in a front portion of the vehicle 2, that is, on a back side of a front grille of the vehicle 2, and detects the temperature (ambient temperature) outside the cabin of the vehicle 2. The ambient temperature sensor 40 is connected to be configured to communicate with the air conditioner ECU 60 through a one-to-one communication line or the like, and a detection signal corresponding to the detected ambient temperature is transmitted to the air conditioner ECU 60.

The humidity sensor 45 is provided inside the cabin of the vehicle 2, for example, inside the instrument panel, and detects humidity (inside humidity) inside the cabin. The humidity sensor 45 is connected to be configured to communicate with the air conditioner ECU 60 through a one-to-one communication line or the like, and a detection signal corresponding to the detected inside humidity is transmitted to the air conditioner ECU 60.

The GPS module 50 receives GPS signals transmitted from three or more (preferably, four or more) satellites above the vehicle 2, and measures the position of the vehicle 2 in which the GPS module 50 is mounted. The GPS module 50 is connected to be configured to communicate with the air conditioner ECU 60 through a one-to-one communication line or an in-vehicle network, such as a CAN, and measured positional information of the vehicle 2 is transmitted to the air conditioner ECU 60.

The in-cabin camera 55 is an imaging device that images a situation inside the cabin of the vehicle 2. The in-cabin camera 55 is connected to be configured to communicate with the air conditioner ECU 60 through a one-to-one communication line or an in-vehicle network, such as a CAN, and a captured image is transmitted to the air conditioner ECU 60.

The air conditioner ECU 60 is an electronic control unit that performs various kinds of control relating to the air conditioner 10 and the rear defroster 20. The air conditioner ECU 60 may be configured such that the functions of the air conditioner ECU 60 are realized by arbitrary hardware, arbitrary software, or a combination of arbitrary hardware and arbitrary software, or may be primarily constituted of, for example, a microcomputer including a CPU, a RAM, a ROM, an I/O, and the like. The air conditioner ECU 60 includes, for example, an air conditioning controller 601 and a defrosting necessity determination unit 602 as a functional unit that is realized by executing one or more programs stored in the ROM on the CPU.

The air conditioning controller 601 performs operation control of the air conditioner 10 according to a set state, such as a set temperature and a mode (a plurality of blowout port modes according to combinations of blowout ports or a defroster mode). Specifically, the air conditioning controller 601 performs operation control of the air conditioner 10 based on detection values of the room temperature sensor 30, the ambient temperature sensor 40, and the like, for example, such that the inside temperature becomes the set temperature. The air conditioning controller 601 performs operation control (ON/OFF control) of the rear defroster 20 according to the set state (ON/OFF). The air conditioning controller 601 starts the air conditioner 10 according to an air conditioning start request from a remote operation assistance controller 802 described below, and performs the operation control of the air conditioner 10 according to set contents included in the air conditioning start request. Details of the control contents according to the air conditioning start request from the remote operation assistance controller 802 will be described in detail.

The defrosting necessity determination unit 602 (an example of a determination unit) determines whether defrosting of a window including a front windshield or a rear windshield of the vehicle 2, is needed. For example, the defrosting necessity determination unit 602 may determine necessity of defrosting of a window by determining a possibility that frost is generated based on the inside temperature and the inside humidity of the vehicle 2 detected by the room temperature sensor 30 and the humidity sensor 45. For example, a possibility that frost is generated may be determined by analyzing a situation of a window included in the captured image of the in-cabin camera 55 through image processing or the like, and the necessity of defrosting of the window may be determined. For example, the necessity of defrosting of the window may be determined by determining a possibility that frost is generated based on real-time frost information relating to a current frost generation situation in each region and distributed from the center server 100 and the positional information of the vehicle 2 received from the GPS module 50. For example, the necessity of defrosting of the window may be determined by determining a possibility that frost is generated based on history information of past frost generation in each region distributed from the center server 100 and the positional information of the vehicle 2 received from the GPS module 50.

The function of the defrosting necessity determination unit 602 may be provided in the engine ECU 80 or may be provided in another ECU that is configured to communicate with the air conditioner ECU 60 and the engine ECU 80. In the above-described case, sensor information (various kinds of information, such as detection signals of the room temperature sensor 30, the ambient temperature sensor 40, and the humidity sensor 45, the positional information of the vehicle 2 from the GPS module 50, and the captured image of the in-cabin camera 55) may be transmitted from the air conditioner ECU 60 to the engine ECU 80 or another ECU through an in-vehicle network, such as a CAN.

The engine 70 is a drive power source of the vehicle 2. The engine 70 is operated by combusting gasoline, diesel, or the like supplied from a fuel tank (not shown) through a fuel pump in a cylinder under the control of the engine ECU 80. The engine 70, specifically, various actuators (a fuel injection device that injects fuel, an ignition device that ignites gasoline injected into the cylinder, an electric motor that is provided to change an opening and closing timing of an intake or exhaust valve, and the like) incorporated in the engine 70 are connected to be configured to communicate with the engine ECU 80 through a one-to-one communication line or the like, and operate according to a control command transmitted from the engine ECU 80.

The engine ECU 80 is an electronic control unit that performs various kinds of control processing of the engine 70 including a starter (not shown). The engine ECU 80 may be configured such that the functions of the engine ECU 80 are realized by arbitrary hardware, arbitrary software, or a combination of arbitrary hardware and arbitrary software, or may be primarily constituted of, for example, a microcomputer including a CPU, a RAM, a ROM, an I/O, and the like. The engine ECU 80 includes, for example, engine controller 801 and a remote operation assistance controller 802 as functional units that are realized by executing one or more programs stored in the ROM.

The engine controller 801 performs operation control of the engine 70 according to an operation state (for example, an accelerator operation amount, a selected gear shift stage of a transmission (not shown), and the like) by a driver of the vehicle 2, an environment state (for example, ambient temperature), or the like around the vehicle 2. For example, the engine controller 801 starts the engine 70 in a case where an ignition switch (IG switch) is ON (IG-ON) or the start request is input from the outside. Specifically, the engine controller 801 drives the starter by switching a relay (not shown) bringing the starter into an electric conduction state to a connection state, and the engine 70 is started by appropriately controlling the fuel injection device and the ignition device in conformity with cranking by the starter.

The remote operation assistance controller 802 (an example of a start controller) starts the engine 70 and the air conditioner 10 by transmitting an engine start request and an air conditioning start request to the engine controller 801 and the air conditioning controller 601 according to the start request received from the terminal 200 by way of the center server 100, respectively. After the start of the engine 70 and the air conditioner 10, in a case where the set operation time (or, as described below, a set operation time changed according to an operation time change request) included in the start request has elapsed after the start, the remote operation assistance controller 802 (an example of a stop controller) stops the air conditioner 10 and the engine 70. For example, in a case where the set operation time has elapsed after the start of the engine 70 and the air conditioner 10, the remote operation assistance controller 802 may stop the air conditioner 10 and the engine 70, or may stop the air conditioner 10 and the engine 70 when another condition is satisfied (for example, when determination is made that the inside temperature increases to a predetermined reference) after the start of the engine 70 and the air conditioner 10. Details of the processing in the remote operation assistance controller 802 will be described below.

The function of the remote operation assistance controller 802 may be provided in the air conditioner ECU 60 or may be provided in another ECU that is configured to communicate with the air conditioner ECU 60 and the engine ECU 80. A functional unit (another example of a stop controller) that makes determination to stop the engine 70 and the air conditioner 10 may be provided in the center server 100 or the terminal 200, instead of the vehicle 2 (remote operation assistance controller 802). For example, in a case where start notification described below is received from the vehicle 2, when the set operation time has elapsed after the reception, the center server 100 may output a stop signal to stop the air conditioner 10 and transmit the stop signal to the vehicle 2. For example, in a case where the start notification is received from the vehicle 2 through the center server 100, when the set operation time has elapsed after the reception, the terminal 200 may output the stop signal to stop the air conditioner 10 and transmit the stop signal to the vehicle 2 through the center server 100. In the above-described case, in a case where the DCM 90 receives the stop signal, the vehicle 2 (remote operation assistance controller 802) sends a stop request to the air conditioning controller 601 and stops the air conditioner 10.

The DCM 90 is a communication device that performs two-way communication with the center server 100 and the terminal 200 through a predetermined communication network N1 (for example, a mobile phone network with multiple base stations as terminals, the Internet, or the like). The air conditioner ECU 60, the engine ECU 80, and the DCM 90 are connected to be configured to communicate with one another through an in-vehicle network, such as a CAN.

The center server 100 includes communication equipment 110 and a processing device 120.

The communication equipment 110 is a device that performs two-way communication with the vehicle 2 (DCM 90) and the terminal 200 through communication networks N1, N2 under the control of the processing device 120 (communication processing unit 1201).

The processing device 120 performs various kinds of control processing in the center server 100. The processing device 120 is primarily constituted of, for example, one or a plurality of server computers including a CPU, a RAM, a ROM, an I/O, and the like, and includes a communication processing unit 1201 and a relay controller 1202 as functional units that are realized by executing one or more programs stored in the ROM on the CPU.

The communication processing unit 1201 controls the communication equipment 110, and performs transmission and reception of various signals (control signal, information signal, and the like) with the vehicle 2 and terminal 200.

The relay controller 1202 relays various signals between the vehicle 2 and the terminal 200. Details will be described below.

The terminal 200 is, for example, a portable terminal, such as a smartphone or a tablet terminal carried with the user of the vehicle 2. The terminal 200 may be, for example, a stationary computer possessed by the user of the vehicle 2. Hereinafter, description will be provided assuming that the terminal 200 is a portable terminal. The terminal 200 includes communication equipment 210, a processing device 220, a touch panel display (hereinafter, simply referred to as a display) 240.

The communication equipment 210 is a device that performs two-way communication with the center server 100 through a predetermined communication network N2 (for example, a mobile phone network with multiple base stations as terminals, the Internet, or the like) under the control of the processing device 220 (communication processing unit 2201), and is, for example, a long term evolution (LTE) module.

The processing device 220 performs various kinds of control processing in the terminal 200. The processing device 220 is primarily constituted of, for example, a computer including a CPU, a RAM, a ROM, an I/O, and the like, and includes communication processing unit 2201, a display controller 2202, a start request unit 2203, and a defrosting request unit 2204 as functional units that are realized by executing one or more programs stored in the ROM on the CPU.

The communication processing unit 2201 controls the communication equipment 210, and performs transmission and reception of various signals with the center server 100.

The display controller 2202 displays various images according to a predetermined operation of the user on the display 240. For example, the display controller 2202 displays various graphical user interfaces (GUI) as an operation screen on the display 240.

The start request unit 2203 transmits the start request for requesting the start of the engine 70 and the air conditioner 10 to the center server 100 through the communication processing unit 2201 according to a predetermined operation of the user on a predetermined GUI displayed on the display 240 by the display controller 2202. With this, the start request transmitted to the center server 100 is transmitted to the vehicle 2 through the center server 100 (relay controller 1202), and the engine 70 and the air conditioner 10 are started. The user can perform, on the predetermined GUI, various settings in a case of operating the air conditioner 10, and the start request unit 2203 transmits the start request including various settings to the center server 100. With this, in the vehicle 2, control of the air conditioner 10 based on set contents (the set temperature as a requested value of the inside temperature by the user, the set operation time as a requested value of the operation time of the air conditioner 10 by the user, and the like) is performed. Details of the processing in the start request unit 2203 will be described below.

The defrosting request unit 2204 transmits a defroster operation request for requesting operation of the air conditioner 10 in the defroster mode (defrosting mode) or an operation time change request for requesting change (extension) of the time for operating the air conditioner 10, that is, the set operation time to the center server 100 through the communication processing unit 2201 according to a predetermined operation of the user on a predetermined GUI displayed on the display 240 by the display controller 2202. With this, the defroster operation request or the operation time change request transmitted to the center server 100 is relayed through the center server 100 (relay controller 1202) and transmitted to the vehicle 2, and operation of the air conditioner 10 in the defroster mode or change of the set operation time of the air conditioner 10 is realized. Details of the processing in the defrosting request unit 2204 will be described below.

Next, specific operation of the remote air conditioning start system 1 will be described referring to FIG. 5.

Figure 5:
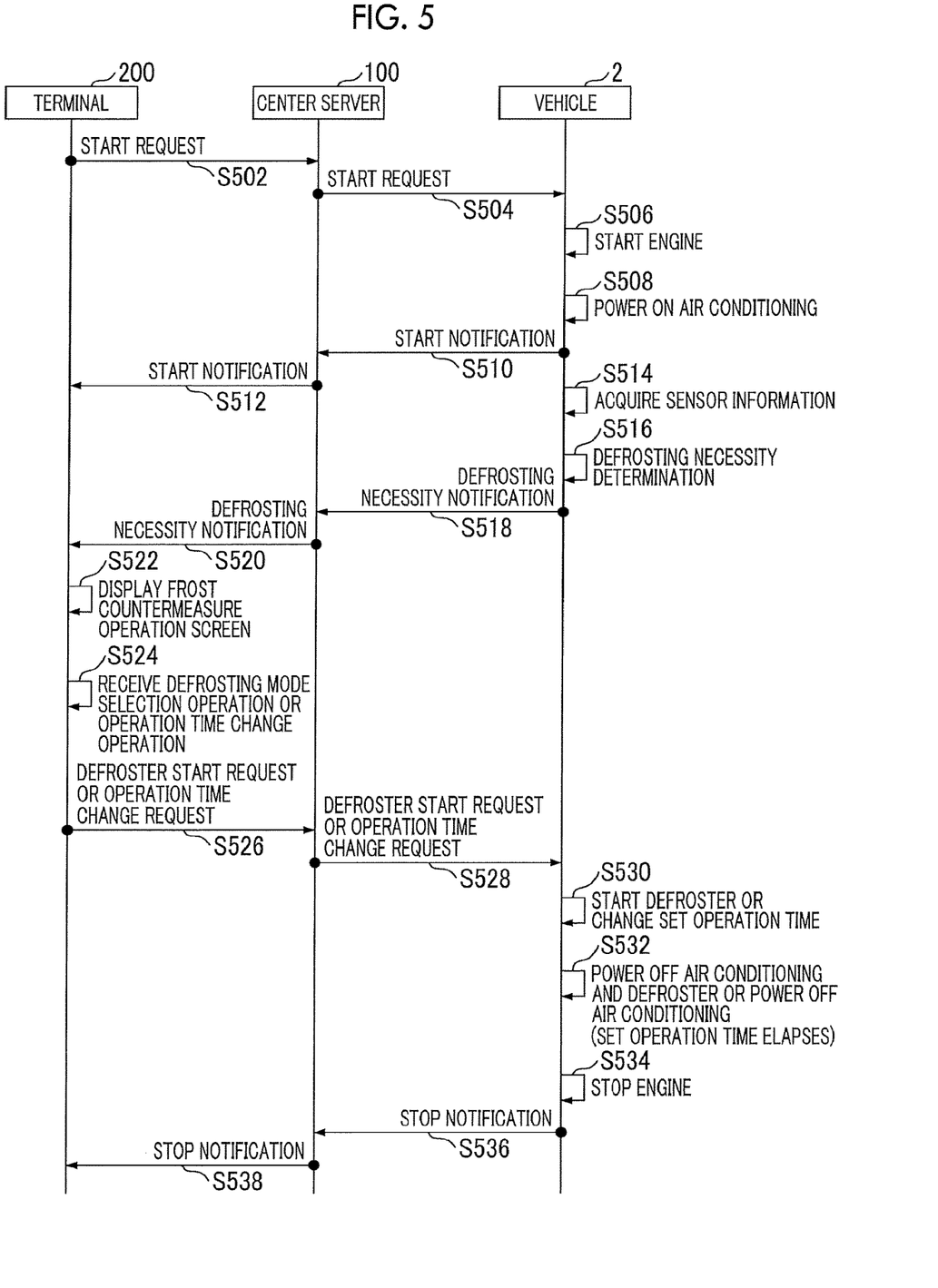
FIG. 5 is a sequence diagram showing an example of operation of a remote air conditioning start system according to the first embodiment.

FIG. 5 is a sequence diagram schematically showing an example of operation of the remote air conditioning start system 1 according to the embodiment.

In Step S502, the start request unit 2203 of the terminal 200 transmits the start request including various set contents (set temperature, set operation time, and the like) to the center server 100 through the communication processing unit 2201 (an example of a first transmission unit) according to a predetermined operation of the user on a predetermined GUI.

In Step S504, in a case where the communication processing unit 1201 (an example of a first reception unit) receives the start request from the terminal 200, the relay controller 1202 of the center server 100 transfers the start request to the vehicle 2 through the communication processing unit 1201 (an example of a second transmission unit).

In Step S506, in a case where the DCM 90 (an example of a second reception unit) receives the start request from the center server 100, the remote operation assistance controller 802 of the vehicle 2 sends the engine start request to the engine controller 801 and starts the engine 70.

Besides, in Step S508, in a case where the DCM 90 receives the start request from the center server 100, the remote operation assistance controller 802 of the vehicle 2 sends the air conditioning start request including the set contents included in the start request from the center server 100 to the air conditioning controller 601 and starts the air conditioner 10. With this, the air conditioning controller 601 performs the operation control of the air conditioner 10 according to the set contents included in the air conditioning start request. For example, the air conditioning controller 601 performs the operation control of the air conditioner 10 based on the set temperature included in the air conditioning start request such that the inside temperature of the vehicle 2 becomes the set temperature.

In Step S510, in a case where the start of the engine 70 and the air conditioner 10 is completed, the remote operation assistance controller 802 transmits start notification to the effect that the start of the engine 70 and the air conditioner 10 is completed to the center server 100 through the DCM 90.

In Step S512, in a case where the communication processing unit 1201 receives the start notification from the vehicle 2, the relay controller 1202 of the center server 100 transfers the start notification to the terminal 200 through the communication processing unit 1201. With this, for example, the display controller 2202 of the terminal 200 displays on the display 240 that the start of the engine 70 and the air conditioner 10 is normally completed when the start notification is received by the communication processing unit 2201, or the like, and can notify the user that the start of the engine 70 and the air conditioner 10 is normally completed.

After the remote operation assistance controller 802 transmits the start notification to the center server 100, in Step S514, the defrosting necessity determination unit 602 of the vehicle 2 acquires the sensor information (various kinds of information, such as the detection signals of the room temperature sensor 30, the ambient temperature sensor 40, and the humidity sensor 45, the positional information of the vehicle 2 from the GPS module 50, and the captured image of the in-cabin camera 55) from a buffer in the RAM of the air conditioner ECU 60.

In Step S516, the defrosting necessity determination unit 602 determines necessity of defrosting of a window of the vehicle 2 based on the acquired sensor information as described above.

In a case where the defrosting necessity determination unit 602 determines that defrosting of the window of the vehicle 2 is needed, in Step S518, the remote operation assistance controller 802 of the vehicle 2 transmits notification (defrosting necessity notification) to the effect that defrosting of the window of the vehicle 2 is needed to the center server 100 through the DCM 90.

In a case where the communication processing unit 1201 receives the defrosting necessity notification from the vehicle 2, in Step S520, the relay controller 1202 of the center server 100 transfers the defrosting necessity notification to the terminal 200 through the communication processing unit 1201.

In a case where the communication processing unit 2201 receives the defrosting necessity notification, in Step S522, the defrosting request unit 2204 (an example of a notification unit) of the terminal 200 displays a frost countermeasure operation screen on the display 240 through the display controller 2202. On the frost countermeasure operation screen, notification (display) to the effect that defrosting is needed is provided to the user, and an operation menu for performing defrosting is displayed.

Figure 6:
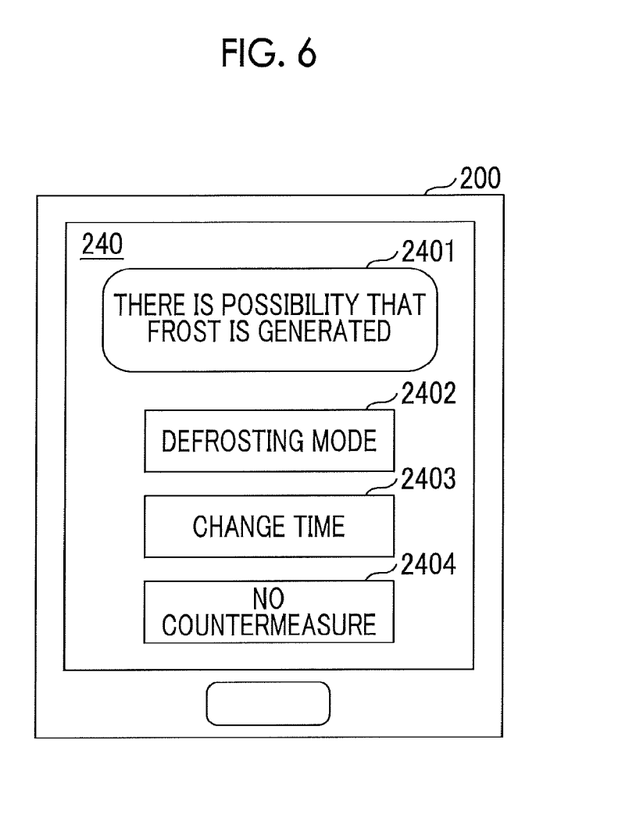
FIG. 6 is a diagram showing an example of a notification screen that is displayed on a touch panel display of the terminal.

For example, FIG. 6 is a diagram showing an example of the frost countermeasure operation screen. In an upper area of the display 240 of the terminal 200, notification 2401 to the effect that defrosting is needed, specifically, the notification 2401 that "there is a possibility that frost is generated" is displayed. In an area below the notification 2401 of the display 240, icons 2402 to 2404 that are selectively operable by the user are arranged and displayed in an up-down direction. Among the icons 2402 to 2404, the icon 2402 arranged on the uppermost side is a virtual operation unit that is provided to select operation of the air conditioner 10 and the rear defroster 20 in the defrosting mode (defroster mode), and "defrosting mode" is described inside the icon 2402. Among the icons 2402 to 2404, the icon 2403 arranged on the central side is a virtual operation unit that is provided to select transition to an operation screen for changing (extending) the set operation time of the air conditioner 10, and "change time" is described inside the icon 2403. The user can input a value of a specific set operation time to be changed on the operation screen after transition. Hereinafter, a selection operation of the icon 2403 on the frost countermeasure operation screen and an operation to input the value of the specific set operation time on the operation screen after transition are collectively referred to as an operation time change operation. Among the icons 2402 to 2404, the icon 2404 arranged on the lowermost side is a virtual operation unit that is provided for selection to the effect that no countermeasure is taken to the defrosting necessity notification, and "no countermeasure" is described inside the icon 2404.

Returning to FIG. 5, in Step S524, the defrosting request unit 2204 of the terminal 200 receives the selection operation (defrosting mode selection operation) of the icon 2402 on the frost countermeasure operation screen shown in FIG. 6 or the selection operation of the icon 2403 and the input operation (operation time change operation) of the value of the set operation time on the operation screen after transition.

In Step S526, the defrosting request unit 2204 of the terminal 200 transmits the defroster operation request or the operation time change request to the center server 100 through the communication processing unit 2201 according to the defrosting mode selection operation or the operation time change operation.

In a case where the communication processing unit 1201 receives the defroster operation request or the operation time change request from the terminal 200, in Step S528, the relay controller 1202 of the center server 100 transfers the defroster operation request or the operation time change request to the vehicle 2 through the communication processing unit 1201.

In a case where the DCM 90 receives the defroster operation request from the center server 100, in Step S530, the remote operation assistance controller 802 of the vehicle 2 transmits a defroster start request to the air conditioning controller 601. With this, the air conditioning controller 601 starts the defroster mode of the air conditioner 10 and starts (ON) the rear defroster 20 upon reception of the defroster start request. In a case where the DCM 90 receives the operation time change request from the center server 100, remote operation assistance controller 802 transmits the operation time change request to the air conditioning controller 601. With this, the air conditioning controller 601 changes the set operation time to the value after change included in the operation time change request.

For example, in a case where the set operation time has elapsed after the start of the engine 70 and the air conditioner 10, in Step S532, the remote operation assistance controller 802 of the vehicle 2 transmits an air conditioning stop request to the air conditioning controller 601. With this, the air conditioning controller 601 stops the air conditioner 10 and the rear defroster 20 in operation or the air conditioner 10 in operation.

Besides, for example, in a case where the set operation time has elapsed after the start of the engine 70 and the air conditioner 10, in Step S534, the remote operation assistance controller 802 of the vehicle 2 sends an engine stop request to the engine controller 801. With this, the engine controller 801 stops the engine 70.

In a case where the stop of the air conditioner 10 and the engine 70 is completed, in Step S536, the remote operation assistance controller 802 of the vehicle 2 transmits stop notification to the effect that the stop of the air conditioner 10 and the engine 70 is completed to the center server 100 through the DCM 90.

In a case where the stop notification from the vehicle 2 is received by the communication processing unit 1201, in Step S538, the relay controller 1202 of the center server 100 transfers the stop notification to the terminal 200 through the communication processing unit 1201. With this, for example, the display controller 2202 of the terminal 200 displays on the display 240 that the stop of the air conditioner 10 and the engine 70 is normally completed when the stop notification is received by the communication processing unit 2201, or the like, and can notify the user that the stop of the air conditioner 10 and the engine 70 is normally completed.

As described above, in the embodiment, the communication processing unit 2201 of the terminal 200 transmits the start request of the air conditioner 10 to the center server 100 according to the request from the start request unit 2203, the communication processing unit 1201 of the center server 100 transfers the received start request to the vehicle 2 according to the request from the relay controller 1202, and in a case where the DCM 90 receives the start request from the center server 100, the remote operation assistance controller 802 of the vehicle 2 starts the air conditioner 10. Then, the defrosting necessity determination unit 602 of the vehicle 2 determines the necessity of defrosting of the window of the vehicle 2, in a case where the defrosting necessity determination unit 602 determines that defrosting of the window of the vehicle 2 is needed (specifically, in a case where the communication processing unit 2201 receives the defrosting necessity notification based on the determination from the center server 100), the defrosting request unit 2204 (notification unit) of the terminal 200 notifies the user that defrosting of the window is needed. Accordingly, for example, the user who plans to start driving immediately after getting on the vehicle 2 can perform a remote operation (defrosting mode selection operation) to operate the defroster (the defroster mode of the air conditioner 10 and the rear defroster 20) from the terminal 200 or can perform a remote operation (operation time change operation) to extend the operation time of the air conditioner 10 according to the notification to the effect that defrosting is needed. For example, the user who plans not to start driving immediately in order to do work or the like before the driving start after getting on the vehicle 2 can be allowed to avoid a particular additional operation by selecting the icon 2404 on the frost countermeasure operation screen as described above even though the notification that defrosting is needed is provided. That is, it is possible to reflect a user's intention in a case of performing defrosting of the window of the vehicle 2. The user's intention is reflected, whereby it is possible to further suppress wasteful operation of the defroster, extension of the operation time of the air conditioner 10, and the like, for example, as described above, despite a situation in which defrosting of the window of the vehicle 2 is not needed as a user's intention. With this, as a result, it is possible to further suppress energy consumption of the vehicle 2 and to further improve fuel efficiency or the like.

In the embodiment, in a case where the defrosting necessity determination unit 602 determines that defrosting of the window of the vehicle 2 is needed (specifically, in a case where the communication processing unit 2201 receives the defrosting necessity notification based on the determination from the center server 100), the defrosting request unit 2204 (notification unit) of the terminal 200 displays on the display 240 of the terminal 200 that defrosting of the window is needed, and displays the selection operation screen (the icon 2402 on the frost countermeasure operation screen) for allowing the user to select a predetermined mode (defroster mode) intended for defrosting of the air conditioner 10 on the display 240. With this, on the display 240 of the terminal 200, the display of the selection operation screen for selecting the predetermined mode intended for defrosting is performed along with the display to the effect that defrosting of the window of the vehicle 2 is needed. Accordingly, the user who desires to defrost can select a mode intended for defrosting immediately without performing an additional operation. For this reason, it is possible to further improve convenience of the user.

In the embodiment, the communication processing unit 2201 of the terminal 200 transmits the start request including the set operation time for operating the air conditioner 10 to the center server 100 according to the request from the start request unit 2203, and in a case where the DCM 90 receives the start request from the terminal 200 through the center server 100, the remote operation assistance controller 802 of the vehicle 2 starts the air conditioner 10 and in a case where the set operation time has elapsed from a predetermined starting point after the start, stops the air conditioner 10. Then, in a case where the defrosting necessity determination unit 602 determines that defrosting of the window of the vehicle 2 is needed (specifically, in a case where the communication processing unit 2201 receives the defrosting necessity notification based on the determination from the center server 100), the defrosting request unit 2204 displays on the display 240 of the terminal 200 that defrosting of the window is needed and display the change operation screen (the icon 2403 on the frost countermeasure operation screen) for allowing the user to change the set operation time. With this, on the display 240 of the terminal 200, the display of the change operation screen for changing the set operation time of the air conditioner 10 is performed along with the display to the effect that defrosting of the window of the vehicle 2 is needed. Accordingly, the user who desires to defrost can perform the change operation, such as an operation to extend the set operation time of the air conditioner 10, immediately without performing an additional operation. For this reason, it is possible to further improve convenience of the user.

In the embodiment, although the set operation time is set and the operation time of the air conditioner 10 started according to the start request transmitted from the terminal 200 to the vehicle 2 through the center server 100 is restricted, a form in which the set operation time is not set (that is, a form in which the operation of the air conditioner 10 is continued until the user arrives at the vehicle 2) may be made. In the above-described case, the processing related to change of the set operation time based on the operation time change operation and the operation time change request of the user will be omitted.

Second Embodiment

A second embodiment will be described.

A remote air conditioning start system 1 according to the embodiment is different from the first embodiment in that the defrosting necessity determination unit 602 is omitted from the vehicle 2 and the function of the defrosting necessity determination unit 602 is provided in the center server 100 (defrosting necessity determination unit 1203). Hereinafter, the same or similar configurations as those in the first embodiment are represented by the same reference numerals, and description will be provided focusing on portions different from the first embodiment.

First, the configuration of the remote air conditioning start system 1 according to the embodiment will be described referring to FIGS. 7 and 8.

The overall configuration of the remote air conditioning start system 1 and the functional configuration of the terminal 200 (processing device 220) according to the embodiment are shown in FIGS. 1 and 4 as in the first embodiment.

Figure 7:
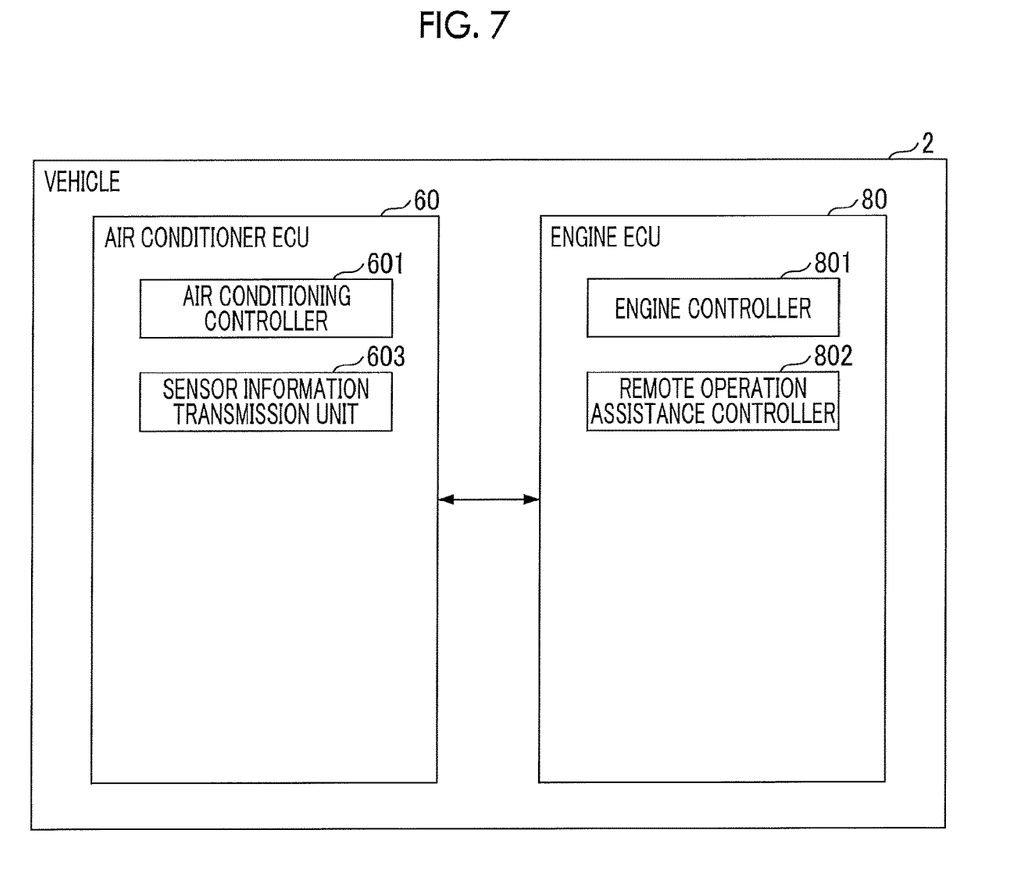
FIG. 7 is a functional block diagram showing an example of the functional configuration of a vehicle (air conditioner ECU and engine ECU) according to a second embodiment.

FIG. 7 is a functional block diagram showing an example of the functional configuration of a vehicle 2 (air conditioner ECU 60 and engine ECU 80) according to the embodiment. FIG. 8 is a functional block diagram showing an example of the functional configuration of a center server 100 (processing device 120) according to the embodiment.

As shown in FIG. 7, the air conditioner ECU 60 includes an air conditioning controller 601 and a sensor information transmission unit 603.

The sensor information transmission unit 603 performs processing for acquiring sensor information (various kinds of information, such as the detection signals of the room temperature sensor 30, the ambient temperature sensor 40, and the humidity sensor 45, the positional information of the vehicle 2 from the GPS module 50, and the captured image of the in-cabin camera 55) from a buffer in the RAM and transmitting the sensor information to the center server 100 through the DCM 90.

Figure 8:
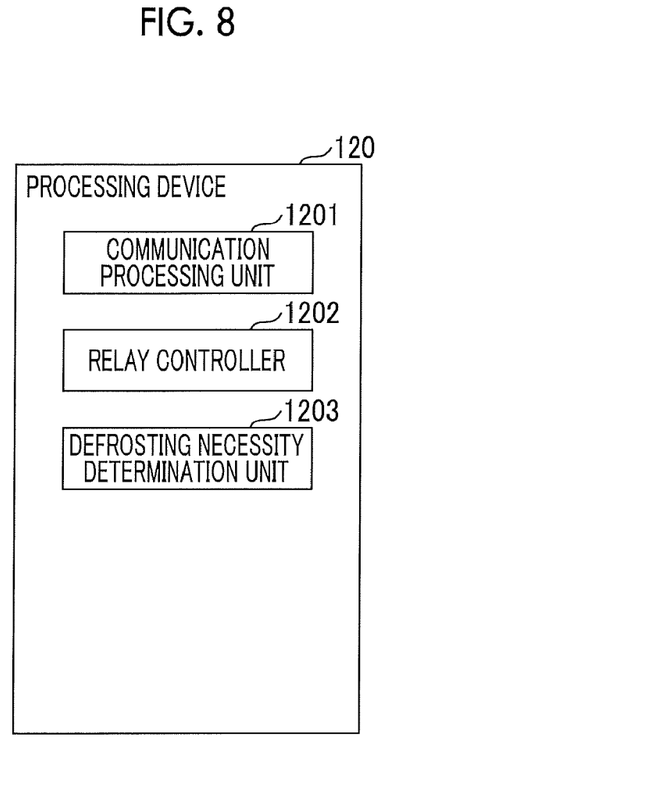
FIG. 8 is a functional block diagram showing an example of the functional configuration of a center server (processing device) according to the second embodiment.

As shown in FIG. 8, the processing device 120 includes a communication processing unit 1201, a relay controller 1202, and a defrosting necessity determination unit 1203.

The defrosting necessity determination unit 1203 (another example of a determination unit) determines whether defrosting of a window including a front windshield and a rear windshield of the vehicle 2 is needed based on the sensor information received from the vehicle 2 by the communication processing unit 1201. The defrosting necessity determination unit 1203 may determine whether defrosting of the window of the vehicle 2 is needed by the same method as in the defrosting necessity determination unit 602 of the above-described first embodiment.

Specific operation of the remote air conditioning start system 1 according to the embodiment will be described referring to FIG. 9.

Figure 9:
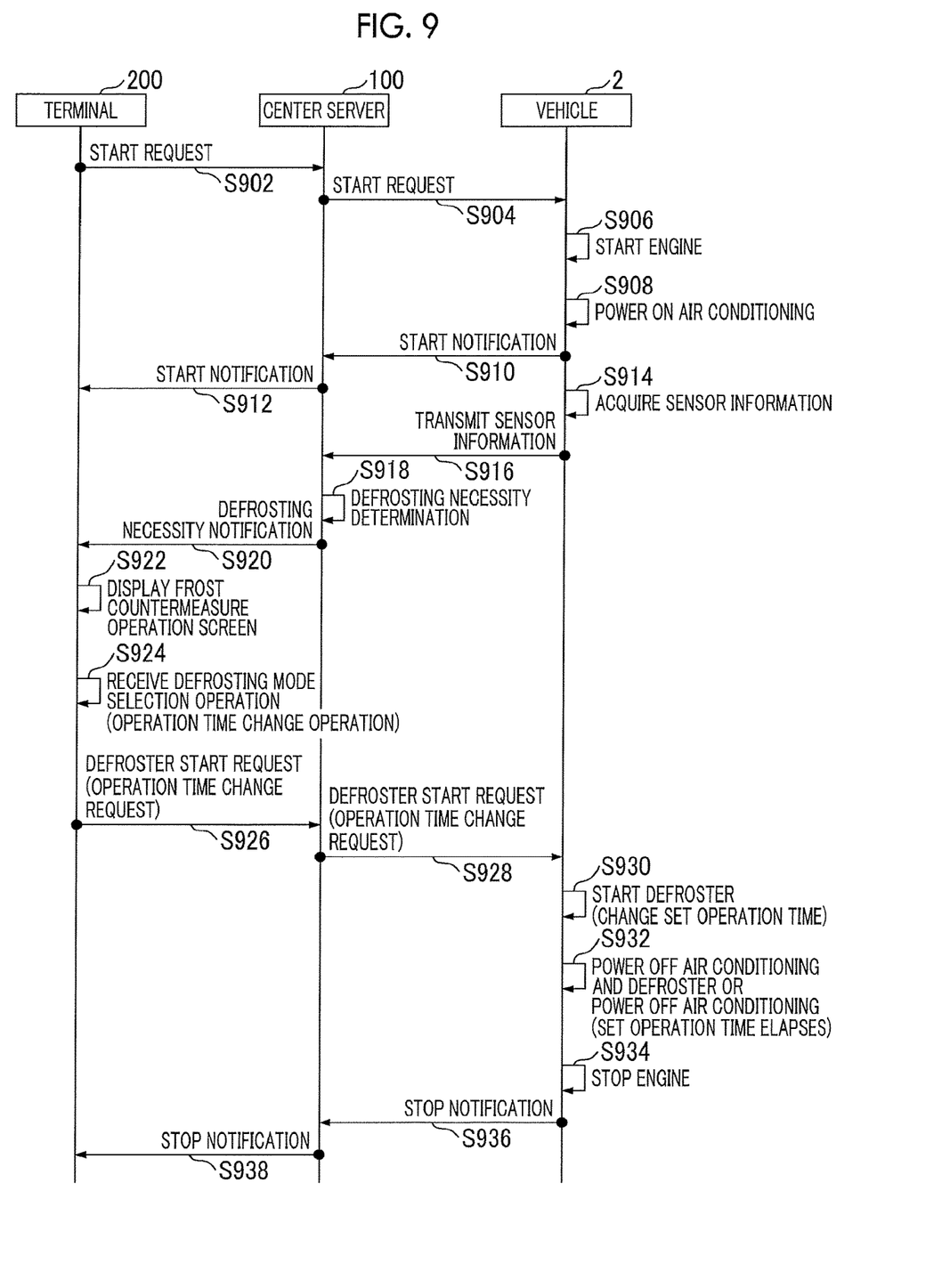
FIG. 9 is a sequence diagram schematically showing an example of operation of a remote air conditioning start system according to the second embodiment.

FIG. 9 is a sequence diagram schematically showing an example of operation of the remote air conditioning start system 1 according to the embodiment.

Steps S902 to S914 are the same as Steps S502 to S514 of FIG. 5, and thus, description thereof will not be repeated.

In Step S916, the sensor information transmission unit 603 of the vehicle 2 transmits the sensor information to the center server 100 through the DCM 90.

In a case where the communication processing unit 1201 receives the sensor information, in Step S918, the defrosting necessity determination unit 1203 of the center server 100 determines the necessity of defrosting of the window of the vehicle 2 as described above based on the received sensor information.

In a case where the defrosting necessity determination unit 1203 of the center server 100 determines that defrosting of the window of the vehicle 2 is needed, in Step S920, the relay controller 1202 of the center server 100 transmits notification (defrosting necessity notification) to the effect that defrosting of the window of the vehicle 2 is needed to the terminal 200 through the communication processing unit 1201 (an example of a transmission unit).

Steps S922 to S938 are the same as Steps S522 to S538 of FIG. 5, and thus, description thereof will not be repeated.

As described above, in the embodiment, the sensor information transmission unit 603 of the vehicle 2 transmits the sensor information to the center server 100 through the DCM 90, and the defrosting necessity determination unit 1203 of the center server 100 determines the necessity of defrosting of the window of the vehicle 2. Then, in a case where the defrosting necessity determination unit 1203 determines that defrosting of the window of the vehicle 2 is needed (specifically, in a case where the communication processing unit 2201 receives the defrosting necessity notification from the center server 100 based on the determination), the defrosting request unit 2204 (notification unit) of the terminal 200 notifies the user that defrosting of the window is needed. With this, in regard to the remote air conditioning start system 1 according to the second embodiment in which the function of the defrosting necessity determination unit 602 in the first embodiment is mounted as the defrosting necessity determination unit 1203 of the center server 100, the same functional effects as in the first embodiment are obtained.

Although the mode for carrying out the disclosure has been described above in detail, the disclosure is not limited to such specific embodiments, and various modification and alterations may be made without departing from the scope of the disclosure.

For example, in the above-described embodiment, although a functional unit that determines whether defrosting of a window of the vehicle 2 is needed is provided in the vehicle 2 (defrosting necessity determination unit 602) or the center server 100 (defrosting necessity determination unit 1203), a form in which the functional unit may be provided in the terminal 200 may be made. In the above-described case, the terminal 200 can determine whether defrosting of a window of the vehicle 2 is needed by receiving the sensor information (various kinds of information, such as the detection signals of the room temperature sensor 30, the ambient temperature sensor 40, and the humidity sensor 45, the positional information of the vehicle 2 from the GPS module 50, and the captured image of the in-cabin camera 55) from the vehicle 2 through the center server 100, or the like.

For example, in the above-described embodiment, although the vehicle 2 includes the engine 70 as a power source, the vehicle 2 may include an electric motor as another power source instead of or in addition to the engine 70.

In the above-described embodiment, although the air conditioner 10 (specifically, the compressor of the air conditioner 10) is operated with at least the engine 70 as a power source, (the compressor of) the air conditioner 10 may be operated solely with electric power supplied from a battery or a fuel cell (for example, a high voltage battery or a fuel cell that supplies electric power to an electric motor as another power source mounted in the vehicle 2) mounted in the vehicle 2, without needing the power of the engine 70. As described above, the remote operation assistance controller 802 solely starts the air conditioner 10 according to the start request transmitted from the terminal 200 through the center server 100. However, in a case where a state of charge (SOC) of the battery or a remaining fuel amount of the fuel cell is equal to or less than a predetermined threshold (for example, a value set in advance as the minimum state of charge or the minimum remaining fuel amount needed for driving the electric motor as the power source of the vehicle 2), even though the DCM 90 receives the start request from the terminal 200 through the center server 100, the remote operation assistance controller 802 may prohibit the start of the air conditioner 10.

What is claimed is:

1. A remote air conditioning start system comprising:
a terminal of a user;
a center server that is configured to communicate with the terminal;
a vehicle that includes an air conditioner and is configured to communicate with the center server;
the terminal including communication equipment configured to transmit a start request of the air conditioner to the center server;
the center server including communication equipment configured to (i) receive the start request from the terminal, and (ii) transmit the start request received from the terminal to the vehicle;
the vehicle including a communication device configured to receive the start request from the center server;
the vehicle including a processor configured to, when the communication device of the vehicle receives the start request, start the air conditioner;
one of, a processor of the center server and the processor of the vehicle configured to determine whether defrosting of a window of the vehicle is needed when the processor of the vehicle starts the air conditioner in response to reception of the start request by the communication device of the vehicle;
in response to a determination that defrosting of the window is needed, one of the communication equipment of the center server and the communication device of the vehicle is configured to transmit a defrosting notification to the terminal;
the communication equipment of the terminal configured to receive the defrosting notification; and
a processor of the terminal configured to, in response to reception of the defrosting notification by the communication equipment of the terminal, notify the user that defrosting of the window is needed, wherein the processor of the terminal is configured to display on a display of the terminal that defrosting of the window is needed, and display a selection operation screen for allowing the user to select one of a plurality of predetermined modes intended for defrosting of the air conditioner on the display of the terminal, and wherein the selection operation screen displays, in response to reception of the defrosting notification, (i) a first selection option corresponding to a first predetermined mode of the plurality of predetermined modes, the first predetermined mode specifying a defrosting mode in which defrosting by the air conditioner is performed, (ii) a second selection option corresponding to a second predetermined mode of the plurality of predetermined modes, the second predetermined mode specifying a set time change mode in which a set time of the air conditioner is changed, and (iii) a third selection option corresponding to a third predetermined mode of the plurality of predetermined modes, the third predetermined mode corresponding to a mode in which no countermeasure is taken.

2. The remote air conditioning start system according to claim 1, wherein one of the processor of the terminal, the processor of the center server, and the processor of the vehicle is configured to, when a set time has elapsed after the processor of the vehicle starts the air conditioner, stop the air conditioner, wherein the communication equipment of the terminal is configured to transmit the start request including the set time for operating the air conditioner to the center server, and the processor the terminal is configured to display on a display of the terminal that defrosting of the window is needed and display a change operation screen for allowing the user to change the set time.

3. The remote air conditioning start system according to claim 1, further comprising:

a room temperature sensor provided in the vehicle; and
a humidity sensor provided in the vehicle,
wherein the determination that defrosting of the window is needed includes a determination of a possibility that frost is generated based on an inside temperature and inside humidity of the vehicle detected by the room temperature sensor and the humidity sensor.

4. The remote air conditioning start system according to claim 1, further comprising an in-cabin camera provided in the vehicle, wherein the determination that defrosting of the window is needed includes a determination of a possibility that frost is generated by analyzing a situation of the window of the vehicle included in a captured image of the in-cabin camera through image processing.

5. The remote air conditioning start system according to claim 1, further comprising a GPS module configured to receive positional information of the vehicle, wherein the determination that defrosting of the window is needed includes a determination of a possibility that frost is generated based on information relating to a current frost generation situation in each region or history information of past frost generation distributed from the center server and the positional information of the vehicle received by the GPS module.

6. A terminal of a user configured to communicate with (i) a center server and (ii) a vehicle including an air conditioner, the terminal comprising:

a processor;
a display; and
communication equipment configured to DI transmit a start request of the air conditioner to the center server, and (ii) receive from the center server a notification that defrosting of a window of the vehicle is necessary in response to the center server receiving the start request and determining that defrosting of the window of the vehicle is necessary;

wherein the processor is configured to display on the display that defrosting of the window is needed, and display a selection operation screen for allowing the user to select one of a plurality of predetermined modes intended for defrosting of the air conditioner on the display of the terminal, and wherein the selection operation screen displays, in response to reception of the notification that defrosting of the window is needed, (i) a first selection option corresponding to a first predetermined mode of the plurality of predetermined modes, the first predetermined mode specifying a defrosting mode in which defrosting by the air conditioner is performed, (ii) a second selection option corresponding to a second predetermined mode of the plurality of predetermined modes, the second predetermined mode specifying a set time change mode in which a set time of the air conditioner is changed, and (iii) a third selection option corresponding to a third predetermined mode of the plurality of predetermined modes, the third predetermined mode corresponding to a mode in which no countermeasure is taken.

7. The terminal according to claim 6, wherein the determination of whether defrosting is needed is based on sensor information transmitted from the vehicle.

* * * * *